United States Patent
Payr

[19]

[11] Patent Number: 6,067,751
[45] Date of Patent: May 30, 2000

[54] PLANT CONTAINER WITH A PLANT STAKE FIXING DEVICE

[76] Inventor: Hubert Payr, 29 Sterngasse, A-2483 Ebreichsdorf, Austria

[21] Appl. No.: 09/091,154

[22] PCT Filed: Jul. 4, 1997

[86] PCT No.: PCT/AT96/00256

§ 371 Date: Jun. 9, 1998

§ 102(e) Date: Jun. 9, 1998

[87] PCT Pub. No.: WO97/22240

PCT Pub. Date: Jun. 26, 1997

[30] Foreign Application Priority Data

Dec. 19, 1995 [AT] Austria ................................ 2059/95
Jul. 15, 1996 [AT] Austria ................................ 1271/96

[51] Int. Cl.[7] .................................................. A01G 9/12
[52] U.S. Cl. ................................................ 47/70; 47/44
[58] Field of Search .............................. 47/70, 44, 47, 47/46, 66.6; 248/27.8

[56] References Cited

U.S. PATENT DOCUMENTS 3,165,863  1/1965  Duran ..................................... 47/70 X

FOREIGN PATENT DOCUMENTS

| 327598 | 2/1976 | Austria . |
|---|---|---|
| 0089291A1 | 9/1983 | European Pat. Off. . |
| 2524256 | 10/1983 | France ........................................ 47/70 |
| 2671453A1 | 7/1992 | France . |
| 1943926 | 3/1971 | Germany . |
| 2323763 | 11/1974 | Germany . |
| 2835939 | 2/1980 | Germany . |
| 636748A5 | 6/1983 | Switzerland . |
| 408516 | 9/1996 | Switzerland . |
| 1109927 | 4/1968 | United Kingdom . |
| 1404327 | 8/1975 | United Kingdom . |
| 2274571 | 8/1994 | United Kingdom . |

Primary Examiner—Michael J. Carone
Assistant Examiner—Jeffrey L. Gellner
Attorney, Agent, or Firm—Birch, Stewart, Kolasch & Birch, LLP

[57] ABSTRACT

A plant container which includes a plant-stake fixing device, wherein the plant container in the region of its rim is provided with at least two coupling components rigidly connected with the side-wall of the plant container. The plant-stake fixing device is provided at least on one end with a mating coupling component and, at a distance from the mating coupling component, with at least one retaining component serving as a holder for a plant stake. The plant-stake fixing device is provided with two mating coupling components arranged at a predetermined distance and in the region of the rim of the plant container there are provided at least two coupling components arranged in correspondence with the mating coupling components and at a distance from each other.

27 Claims, 3 Drawing Sheets

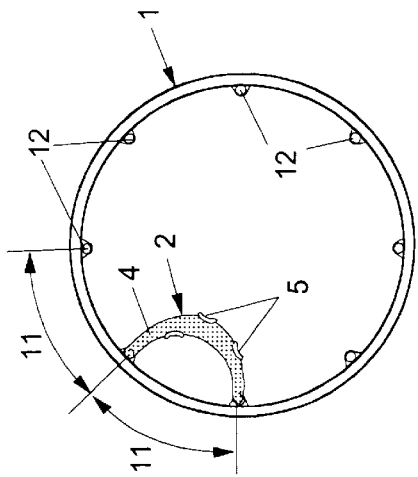
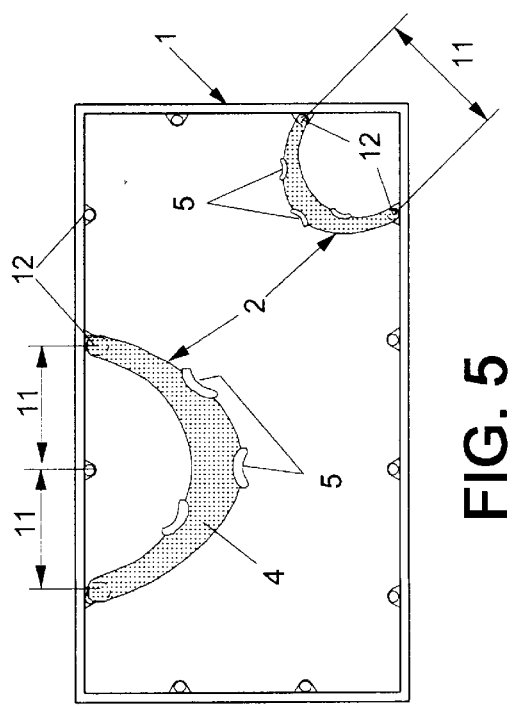
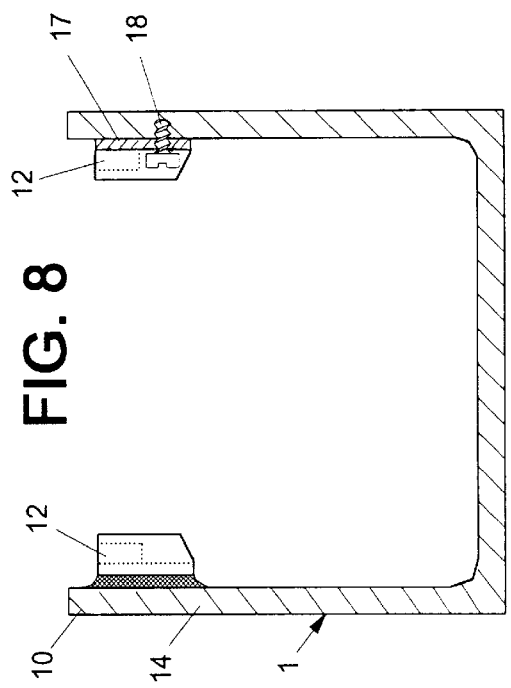
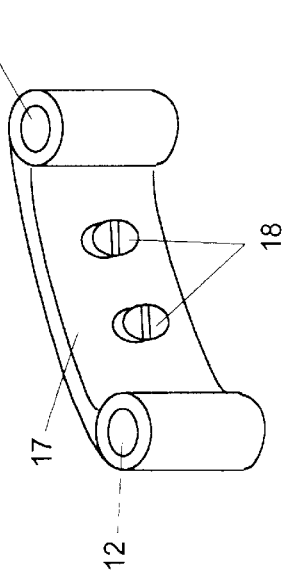

PLANT CONTAINER WITH A PLANT STAKE FIXING DEVICE

This application is the national phase under 35 U.S.C. §371 of prior PCT International Application No. PCT/AT 96/00256 which has an International filing date of Dec. 19, 1996 which designated the United States of America, the entire contents of which are hereby incorporated by reference.

BACKGROUND OF THE INVENTION

1. Field of the Invention

The invention relates to a plant container comprising a plant-stake fixing device.

2. Description of Related Art

Plant stakes for supporting potted plants are usually put into the planting material, such as into potting soil or, with hydroponics, into a hydro-material. The plant stakes may loosen with time and will then no longer offer reliable support for the plant. This is increasingly the case if the plant grows in a particular direction. The stake may, however, also become loosened when transporting the potted plant and above all outdoors, if the potted plant is exposed to the weather.

To overcome this problem, there have been attempts to attach the plant stakes via cords or wires by means of nails driven into a nearby wall. One of the problems associated with this method is that it will no longer be possible to move or turn the pot plant.

It is known (CH-A-636.748) to fasten a screw clamp to the rim of the plant container, to fix the plant stake with respect to the plant container. A rail departs from the screw clamp that is directed toward the center of the plant container, the rail being urged against the rim of the plant container by means of the screw clamp. The plant stake can be attached by a further screw clamp to the rail.

This known device has the disadvantage in that the plant stake is still able to tilt to the side, since forces acting on the plant stake from the plant may only run in the direction of the rail, to enable them to be passed on into the plant container.

A fixing device for a plant stake by which the forces acting on the plant stake from all directions can be conducted into the plant container is known from CH-A-408.516. In accordance with this document, a carrying device is provided which can be clamped to the rim of the plant container and is equipped with a bracket of tubular construction projecting toward the center of the plant container. A lifting lug can be inserted into this bracket and fixed, with the lifting lug being displaceable against the bracket in the radial direction of the plant container. At its inner end, i.e., at its one end that is directed toward the center of the plant container, this lifting lug carries a sleeve which is closed at its lower end and into which the plant stake can be inserted. The plant stake does not come into contact with the soil of the potted plant, but via the plant stake very great forces are conducted into the bracket which is clampable to the rim of the plant container via the lifting lug, so that the bracket has to be of correspondingly rigid and massive design. This known fixing device for a plant stake is not only very complicated in construction and hence correspondingly expensive to produce, but by its bulky and massive construction will affect the look of the potted plant. Moreover, all of the forces are passed onward to the rim of the plant container exclusively, so that the latter has to resist a very considerable load.

From DE-C-28 35 939 it is known to form a holder for a plant stake integrally with the plant receptacle. But with this construction the plant stake can only be arranged in the region of the rim of the plant receptacle, since otherwise the holder integrated with the plant receptacle would have to project far into the interior of the receptacle, which would, cause difficulties and high costs in the production of the plant receptacle.

According to AT-B-327.598 recesses into which a plant stake can be inserted are provided inside the plant receptacle, on the bottom thereof. Yet, with this method the plant stake must be inserted before filling the plant receptacle with earth. Subsequent mounting is only feasible with difficulty as the recess provided at the bottom of the plant receptacle would first have to be uncovered. One problematic aspect of this construction is a good support of the plants, since the plant stake is only fixed with respect to the plant receptacle by its lower end.

In accordance with EP-A-0 089 291 a plant receptacle is provided in its corner regions with eyelets into which plant stakes may be inserted. Again there is no possibility to arrange the plant stake at a greater distance from the rim of the plant receptacle, i.e. near the stem of the plant.

From FR-A-2 671 453 there is known a plant container comprising a plant-stake fixing device of the initially described kind. With this known device, the plant-stake fixing device is formed by several sleeves arranged in linear succession and combined so as to form a rigid unit, with the plant stake being adapted to be stuck through one of these sleeves and into the earth that has been placed in the plant container. By means of a stick arranged on one of its ends the plant-stake fixing device is inserted properly in a bore arranged on the rim of the plant container, wherein a horizontal swing of the plant-stake fixing device about the axis of the bore of the plant container is avoided in that a spring is arranged on the stick of the plant-stake fixing device, which spring engages a groove of the bore arranged on the plant container. A device of this kind requires a plant container of very complex construction and of the proper wall thickness for receiving the stick provided on the plant-stake fixing device. For a thin-walled plant container, a special crown is needed which lengthens the plant container toward the top and which is of thick-walled construction and carries the bore for receiving the stick for the plant-stake fixing device. This is also demanding with respect to cost and production. A further drawback of the known construction is also to be seen in that if greater forces act on the plant-stake fixing device in a horizontal direction—which will be the case especially if the plant stake is inserted in a sleeve arranged at a greater distance from the rim of the container—the plant stake is no longer safely retained or the forces transmit into the wall of the plant container, resulting in the possibility of damages to the respective wall region.

With the known construction, the outward appearance of the plant container is also impaired by the grooves which pierce the wall of the plant container toward the exterior and into which there engages the spring of the stick of the plant-stake fixing device. In addition, the relatively thick upper rim of the plant container is also unsightly. Moreover, the plant-stake fixing device projects beyond the upper rim so that the plant-stake fixing device also affects the appearance of the plant container.

According to a first embodiment—DE-A 2 323 763—the lower end of the plant stake projects into a sleeve, thereby fixing the plant stake in the bottom region of the plant container.

In accordance with a further embodiment, the lower end of the plant stake is fixed in a plug-in hole arranged on a tie-bar traversing the plant container on the height level of the rim of the same.

A similar device is known from GB-A-2 274 571, wherein the plug-in hole for the plant stake is arranged at the region of co-joining of radially extending arms. For attaching the arms to the rim of the plant container there is provided a ring extending around the periphery of the plant container and straddling the rim of the plant container.

SUMMARY OF THE INVENTION

The present invention aims to avoid the drawbacks and difficulties that have been described and has as its object to provide a plant container comprising a plant-stake fixing device by which the plant stake is safely and reliably fixed with respect to the plant container, with no loosening of the plant stake occurring even after a prolonged period, and with the forces acting on the plant stake being able to be safely passed on into the plant container. The forces acting on the plant container should exert their load through the plant stake on the plant container as evenly as possible, and not just punctually, thereby minimizing the danger of plant container breakage. The plant-stake fixing device is to be easily affixable to the plant container even subsequently, i.e. without the need for major manipulations. Further, the plant container including the plant-stake fixing device should just comprise a small number of parts which are producible in a simple and cost-effective manner and which affect the look of the plant pot only slightly when the plant-stake fixing device and the plant stake have been mounted.

In accordance with the present invention there results a three-point support of the plant-stake in the plane of the rim region of the plant container, whereby the plant stake is safely retained even if major forces are applied. The forces are distributed to two locations so that a relatively small load is imposed upon the plant container wall.

The plant container is particularly easy to produce if the coupling components, as is known per se, are formed integrally with the side-wall of the plant container.

A plurality of coupling components suitably are arranged in the region of the rim of the plant container, enable the arrangement of the plant stake in different positions relative to the plant container. In each instance, two of these coupling components are arranged at a distance corresponding to the distance of the mating coupling components of the plant-stake fixing device, wherein advantageously the coupling components are arranged in the region of the rim of the plant container at equal distances from each other.

A manner of fixing the plant stake to the plant container that allows much variation is achieved if the plant-stake fixing device is provided with two mating coupling components provided at a distance corresponding to twice or several times the distance of two coupling components.

A plant container of simple construction is characterized in that the coupling component—as is known per se—is formed by a sleeve or a pin and the mating coupling component is formed by a pin or a sleeve.

In accordance with a preferred embodiment of the initially described kind, the coupling component and the mating coupling component extend over a predetermined circumferential region of the rim region, wherein the coupling component suitably is constructed as a strap or a slit and the mating coupling component as a slit or a strap.

If a plant container is to be subsequently fitted with a plant-stake fixing device, then suitably the coupling component is screw-fastened to the side-wall of the plant container or in accordance with another embodiment the coupling component is glued to the side-wall of the plant container.

It is less impairing optically if the coupling component is provided on the inner face of the side-wall of the plant container.

Further possible variations of arranging the plant stake result if the plant-stake fixing device is equipped with two or several retaining components of which each is provided at a different distance from the mating coupling component.

It is preferred that the retaining component be constructed as a through hole, wherein suitably the through hole is provided with break-out parts so that it can be enlarged and adjusted to the diameter of the plant stake.

Another preferred embodiment is characterized in that the retaining component is constructed as a supporting strap against which the plant stake can be brought into abutment and to which the plant stake can be fastened by means of a clamping device, preferably a cable-binding loop.

A particularly stable fastening of the plant stake results if the plant-stake fixing device as such is of rigid construction.

In order to compensate for the different inclinations of different plant containers it is preferred that the coupling component and the mating coupling component be formed as the components of an articulation.

In accordance with yet another preferred embodiment the production of a plant container comprising a plant-stake fixing device is to be particularly simple and cost-effective. In particular, tooling costs are to be kept low while still offering universal applicability with the most diverse sizes of plant containers, wherein applicability with large-size plant containers is an important condition.

Advantageously, this is achieved in that the mating coupling component is connected with at least one plant-stake fixing device through an articulated connection.

Coupling components and mating coupling components are particularly easy to produce if the articulated connection is constructed as a pin-and-sleeve connection, wherein advantageously the pin is provided on the mating coupling component and the sleeve on the plant-stake fixing device.

Particularly simple production of the plant container is enabled if the coupling component is formed as an undercut groove and the mating coupling component as a corresponding counterpart of the groove, wherein the groove suitably exhibits a dovetailed cross-section.

To ensure the correct position of the mating coupling component on the plant container it is advantageous if the groove at its lower end is provided with a stop that the mating coupling component can abut against.

A construction that is particularly suitable on account of its stability is characterized in that the groove extends in a vertical direction and the groove walls are formed integrally with the plant container.

In order to get by with only a single model of a plant-stake fixing device, two plant-stake fixing devices are connected by means of an articulated connection, wherein the articulated connection has a swivel axis that extends in a roughly vertical direction, and wherein the swivel axis advantageously is formed by the plant stake. This does away with the need for providing a special construction forming the swivel axis.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following, the invention is explained in more detail with reference to several embodiments that are represented in the drawings, wherein

FIGS. 5 and 6, each of which shows a top view of a plant container with inserted plant-stake fixing device, illustrate different ways of arranging the plant-stake fixing device.

FIG. 7 shows a detail of the plant-stake fixing device and

FIG. 8 shows the arrangement of that detail in a plant container. Further advantageous embodiments are illustrated in FIGS. 9 to 11, with FIG. 9 depicting a detail of a plant container with a mounted plant-stake fixing device analogous to FIG. 1.

DETAILED DESCRIPTION OF THE PREFERRED EMBODIMENTS

Figure 1:
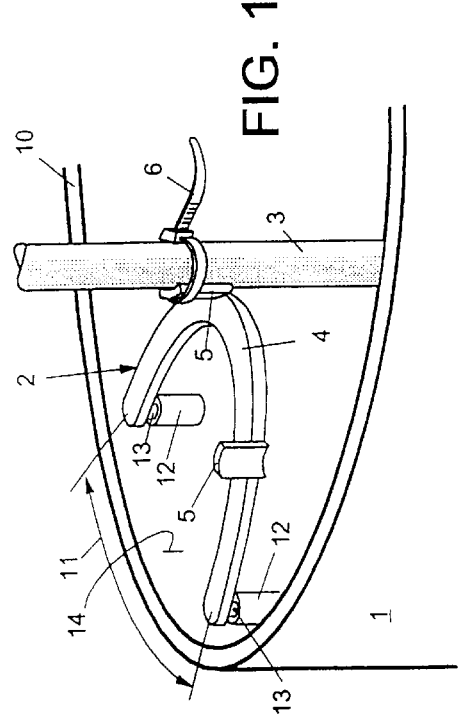
FIG. 1 illustrates in perspective view a detail of a plant container having the plant-stake fixing device mounted thereto.

To a plant container 1, preferably made of plastics material, there is fastened a plant-stake fixing device 2 having a plant stake 3 fixed to it. The plant-stake fixing device 2 is essentially formed by a component 4 bent roughly in the shape of a U and preferably made from plastics material, which is fitted with at least one retaining component 5 adapted to have the plant stake 3 fastened to it. According to FIG. 1 there are provided two retaining components 5 each of which is designed as a supporting strap.

The plant stake 3 is made to abut against one the retaining components 5 and it is fixed thereto by means of a clamping device 6 designed e.g. as a cable-binding loop. The second retaining component may serve for the fastening of another plant stake 3 or the plant stake 3 may optionally be fastened to the second retaining component. The plant stake 3 has a lower end 7 which extends down to the bottom 8 of the plant container 1, where it is supported. The lower end 7 of the plant stake 3 is sufficiently secured against lateral displacement by the vegetable mold or sail 9 (FIG. 2).

The plant-stake fixing device 2 is rigidly fixed to the plant container 1, namely on the height level of the rim region 10 by means of two coupling components 12 provided at a distance 11 in the circumferential direction from each other in the region of the rim 10 of the plant container 1. The said coupling components are adapted to be coupled with mating coupling components 13 arranged on the plant-stake fixing device 2. The coupling components 12 are designed as sleeves and the mating coupling components 13 as pins that can be inserted into the sleeves. It is understood that the coupling components 12 and mating coupling components 13 could be of different construction, e.g. ball snap connections. In accordance with FIG. 1 the coupling components 12 are formed integrally with the side-wall 14 of the plant container 1.

Figure 2:
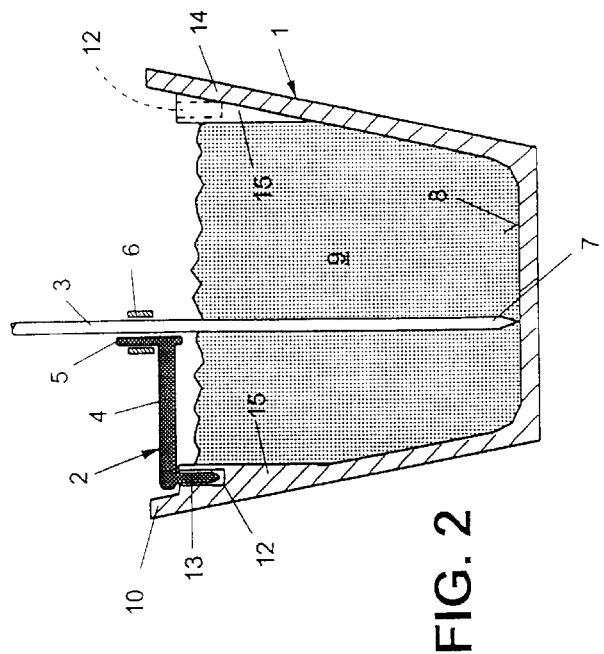
FIG. 2 shows a vertical section through a plant container of different construction.

According to FIG. 2, the coupling components 12 are provided in wedge-shaped projections 15 cast integrally with the slanting side-wall 14 of the plant container 1.

Figure 3:
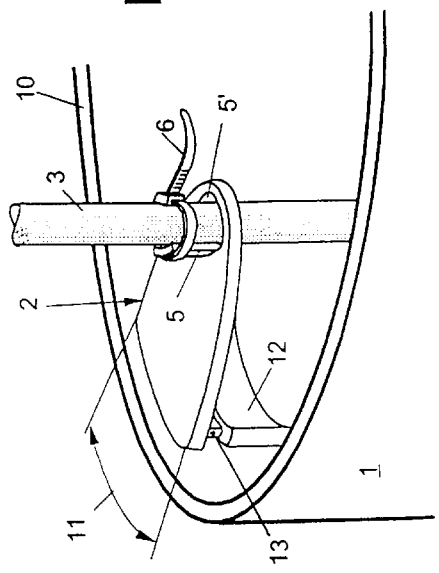
FIG. 3 depicts a modified embodiment in an illustration analogous to FIG. 1.

FIG. 3 shows the embodiment of a coupling component 12 that takes the form of a slit extending over a predetermined distance 11 of a circumferential region of the plant container 1 and that is adapted to have the mating coupling component 13, in this case formed as a strap, inserted thereinto. The retaining component of the plant-stake fixing device 2 of this embodiment is designed as a through hole 5' through which the plant stake 3 is passed. In addition, a supporting strap 5 is also provided, in order to enable the plant stake to be retained in the through hole free from play. A cable-binding loop 6 serves for fixing the plant stake 3 to the supporting strap 5.

Figure 4:
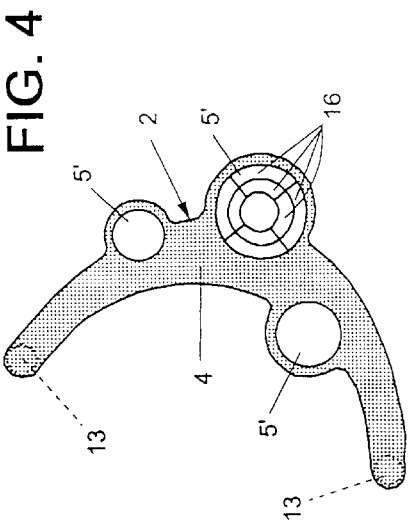
FIG. 4 shows a plant-stake fixing device in top view.

According to FIG. 4, one of the through holes 5' is provided with break-out parts 16, thus enabling the through hole 5 to be adjusted to the diameter of the plant stake 3.

FIGS. 5 and 6 show different ways of mounting a plant-stake fixing device 2 to a plant container 1. The plant container 1 is provided with coupling components 12 arranged in the region of its rim 10 at distances 11 from each other. The plant-stake fixing device 2 is equipped with mating coupling components 13 provided at a distance corresponding exactly to once, twice or three times the distance 11 of two neighboring coupling components 12.

In FIG. 7 there are illustrated two coupling components 12, likewise designed as sleeves, which by means of screws 18 that are arranged on a connecting web 17 can be subsequently mounted to a plant container 1. FIG. 8 illustrates how these coupling components 12 are mounted to a plant container 1. It is also feasible for the coupling components 12 to be glued onto the plant container 1, as is illustrated on the left-hand side in FIG. 8.

Figure 10:
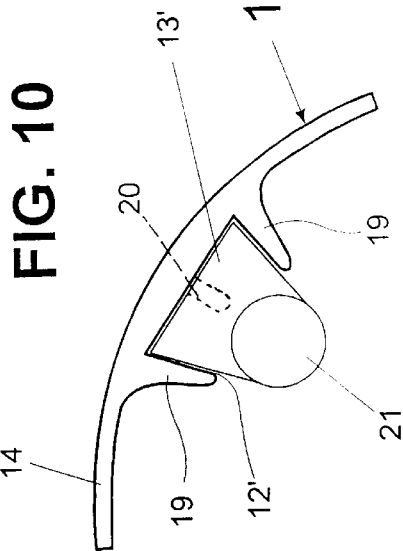
FIG. 10 shows a top view on an enlarged scale in the direction of arrow X of FIG. 9.
Figure 9:
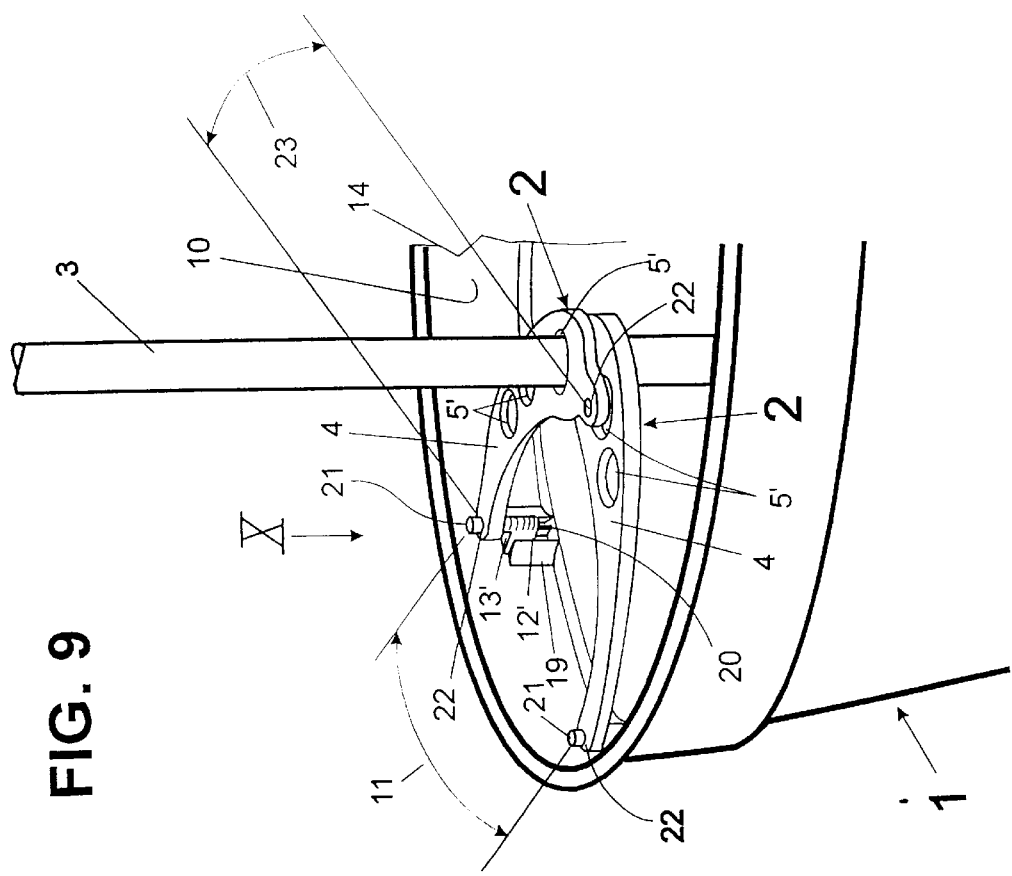

According to FIGS. 9 and 10, the plant-stake fixing device 2 is rigidly fixed to the plant container 1, namely on the level of the region of the rim 10 thereof, again by means of two coupling components 12' provided at a peripheral distance 11 from each other at the region of the rim 10 of the plant container 1. The coupling components 12' can be coupled to the plant-stake fixing device 2 by means of mating coupling components 13'. The coupling components 12' are designed as undercut and vertically oriented grooves, and the mating coupling components 13' as blocks which can be pushed into the grooves. The coupling components 12' and the mating coupling components 13' may also take other forms, they could e.g. be constructed as snap connections of various designs. The groove walls 19 preferably are formed integrally with the side-wall 14 of the plant container 1, i.e. are produced in the same production process, which would be the obvious choice if the plant container is fabricated from plastics material. But they may also be connected with the plant container 1 subsequently, e.g. by gluing, etc.

Figure 11:
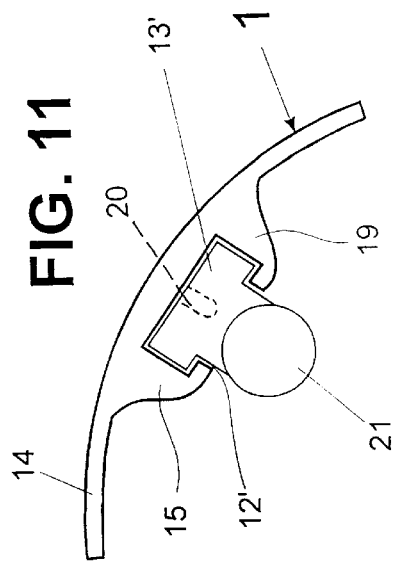
FIG. 11 illustrates a modified embodiment in an illustration analogous to FIG. 10.

According to the embodiment depicted in FIG. 11, the undercut groove 12' is designed to have a rectangular cross-section, and the mating coupling component 13' that is adapted to be inserted into the groove has a corresponding mating profile. With all embodiments, the mating coupling component 13' is insertable into the groove 12' as free from play as possible, but suitably by hand. At the lower end of the groove, a stop 20 is provided which is designed, e.g. as a web produced integrally with the plant container 1.

The mating coupling component 13' carries a pin 21 that fits into a bore 22 of the plant-stake fixing device 2. The bore forms a sleeve that fits the pin as free from play as possible. Each plant-stake fixing device 2 has two bores 22 which are provided at its respective ends. The plant-stake fixing device 2 is of arc-shaped design, so that if a single plant-stake fixing device is fastened to the pin 21 of the mating coupling components 13' the through holes 5' that it is provided with will assume positions located at a distance from the region of the rim 10 of the plant container 1. The distance 11 of the coupling components 12' on the plant container 1 corresponds to the distance 23 of the two bores 22 or sleeves, respectively, which are arranged on the ends of the plant-stake fixing device 2.

According to FIG. 9, two plant-stake fixing devices 2 are coupled with each other, namely through an articulated connection formed by the plant stake 3 that projects through one each of the superimposed through holes 5' of the plant-stake fixing devices 2. This makes it possible to make do with only two coupling components 12' even in the case of larger-diameter plant containers 1, while still arranging the plant stake 3 at a greater distance from the region of the rim 10 of the plant container 1.

Instead of the pin-and-sleeve connection between the mating coupling component and the plant-stake fixing device 2 it is also feasible to provide a different kind of connection, for example a snap connection. Advantageously, this connection will in any case have a very limited movement in a vertical plane. What is essential, however, is the movement in the horizontal plane so as to enable two plant-stake fixing devices 2 to be arranged, as is illustrated in FIG. 9. The plant stake 3 can be passed through different superimposed through holes 5', which are freely selectable, for which purpose the two plant-stake fixing devices 2 are connected with the plant container 1 by means of an articulated connection 21, 22 allowing such movement in a horizontal direction.

The invention is not limited to the illustrated exemplary embodiments but may be modified in various respects. For instance, it is not necessary for the plant-stake fixing device 2 to exhibit a U-shaped design in plan view; it could also have a different plan form. It is only important that the plant stake 3 be arranged at a distance from the side-wall 14 of the plant container 1 and that the plant-stake fixing device 2 has one or two mating coupling components 13, 13' that are engageable with the coupling components 12, 12' arranged on the side-wall 14 of the plant container 1. The technical designer has complete freedom with regard to the possible design of the coupling components 12, 12' and the mating coupling components 13, 13'. He just has to assure that there can be no lateral yielding of the plant-stake fixing device in the plane of the upper rim 10 of the plant container 1.

If a plant-stake fixing device 2 is to be applicable with plant containers having walls of different inclination, the coupling component 12, 12' and the mating coupling component 13, 13' suitably are each designed as an articulation component, whereby the plant-stake fixing device 2 in spite of differently inclined side-walls 14 of the plant container 1 can be disposed in a roughly horizontal position.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A plant container comprising:
   a container body having two coupling components rigidly connected to only an inside surface of a side-wall of the container body;
   a plant stake; and
   a plant-stake fixing device including two mating coupling components arranged at a predetermined distance from each other and at least one retaining component for holding the plant stake, each of said two mating coupling components being removably engageable with said two coupling components, respectively,
   wherein said plant stake extends through the retaining component and into a bottom region of the container body.

2. The plant container according to claim 1, wherein said two coupling components are formed integrally with the side-wall of the container body.

3. The plant container according to claim 1, wherein said two coupling components are arranged adjacent the rim of the container body, and a distance between said two coupling components is generally equal to a distance between said two mating coupling components.

4. The plant container according to claim 3, wherein there are more than two of said coupling components, and each of said coupling components is separated by an equal distance.

5. The plant container according to claim 4, wherein said two mating coupling components are provided separated from each other by a distance at least twice the distance separating the coupling components.

6. The plant container according to claim 1, wherein said two coupling components are formed by a sleeve and said two mating coupling components are formed by a pin.

7. The plant container according to claim 1, wherein said two coupling components are formed by a pin and said two mating coupling components are formed by a sleeve.

8. The plant container according to claim 1, wherein said two coupling components are screw-fastened to the side-wall of the container body.

9. The plant container according to claim 1, wherein said two coupling components are glued to the side-wall of the container body.

10. The plant container according to claim 1, wherein there are at least two of said retaining components, each of said at least two retaining components are constructed as a through hole and are provided at a different distance from said two mating coupling components.

11. The plant container according to claim 1, wherein said at least one retaining component is constructed as a through hole.

12. The plant container according to claim 11, wherein said through hole is provided with break-out parts for enlarging the through hole to adjust to a diameter of the plant stake.

13. The plant container according to claim 1, wherein said at least one retaining component is constructed as a supporting strap securable to the plant stake by a clamping device.

14. The plant container according to claim 13, wherein the clamping device is a cable-binding loop.

15. The plant container according to claim 1, wherein each of said two mating coupling components are connected to a body of said plant-stake fixing device through a first articulated connection.

16. The plant container according to claim 15, wherein each of said first articulated connections is a pin-and-sleeve connection.

17. The plant container according to claim 16, wherein the pins are provided on said two mating coupling components and the sleeves are provided on said body of the plant-stake fixing device.

18. The plant container according to claim 15, wherein said body includes first and second components connected together by a second articulated connection, said second articulated connection includes a swivel axis extending in a generally vertical direction.

19. The plant container according to claim 18, wherein said swivel axis is formed by the plant stake.

20. The plant container according to claim 1, wherein each of said two coupling components is formed as an undercut groove and each of said two mating coupling components is formed as a corresponding counterpart of the groove.

21. The plant container according to claim 20, wherein the grooves have a dovetailed cross-section.

22. The plant container according to claim 20, wherein the grooves are provided with a stop at a lower end thereof for abutting against each of said two mating coupling components, respectively.

23. The plant container according to claim 20, wherein the grooves extend in a vertical direction and walls of the grooves are formed integral with the container body.

24. A plant container comprising:

a container body having a single coupling component rigidly connected to only an inside surface of a sidewall of the container body, said single coupling component extending over a predetermined circumferential segment of said container body;

a plant stake; and a plant-stake fixing device including a single mating coupling component extending over a predetermined circumferential segment of said container body, and at least one retaining component for holding the plant stake, said single mating coupling component being removably engageable with said single coupling component, wherein said plant stake extends through the retaining component and into a bottom region of the container body.

25. The plant container according to claim 24, wherein said single coupling component is formed by a strap and said single mating coupling component is formed by a slit.

26. The plant container according to claim 24, wherein said single coupling component is formed by a slit and said single mating coupling component is formed by a strap.

27. A plant container comprising:

a container body having two coupling components rigidly connected to a side wall of the container body, said coupling components not extending to an outside surface of the container body;

a plant stake; and a plant stake fixing device including two mating coupling components arranged at a predetermined distance from each other and at least one retaining component for holding the plant stake, each of said two mating coupling components being removably engageable with said two coupling components, respectively, wherein said plant stake extends through the retaining component and into a bottom region of the container body.

* * * * *